United States Patent [19]

Silverthorn et al.

[11] Patent Number: 4,534,461
[45] Date of Patent: Aug. 13, 1985

[54] CONVEYOR CONSTRUCTION FOR CONVEYING MATERIALS TO AN ELEVATED LOCATION

[75] Inventors: Charles R. Silverthorn, Eureka; Marcus N. Allhands, Gridley, both of Ill.

[73] Assignee: A. O. Smith Harvestore Products, Inc., Arlington Heights, Ill.

[21] Appl. No.: 409,331

[22] Filed: Aug. 18, 1982

[51] Int. Cl.$^3$ .................... B65G 21/10; B65G 37/00
[52] U.S. Cl. ........................ 198/592; 198/612; 198/861
[58] Field of Search .............. 198/592, 612, 861, 735

[56] References Cited

U.S. PATENT DOCUMENTS

| Re. 25,832 | 8/1965 | Mighell | 198/592 |
|---|---|---|---|
| 1,547,276 | 7/1925 | Wentz | 198/699 |
| 1,657,122 | 1/1928 | Hoffmann | 198/592 |
| 1,888,175 | 11/1932 | Kimes | 198/699 |
| 1,899,766 | 2/1933 | McWilliams | 198/711 |
| 1,945,843 | 2/1934 | Woodruff | 198/199 |
| 2,137,713 | 11/1938 | Conner | 198/199 |
| 2,189,080 | 2/1940 | Novak | 198/199 |
| 2,395,349 | 2/1946 | Slavicek | 198/612 |
| 2,808,923 | 10/1957 | Rogers | 198/98 |
| 2,809,743 | 10/1957 | Hinchcliffe | 198/199 |
| 2,837,201 | 6/1958 | Warren | 198/592 |
| 2,851,148 | 9/1958 | Kraft et al. | 198/592 |
| 2,875,887 | 3/1959 | Hinchcliffe | 198/199 |
| 2,951,579 | 9/1960 | Stauth et al. | 198/735 |
| 3,100,566 | 8/1963 | Hinchcliffe | 198/199 |
| 3,319,774 | 5/1967 | Christensen | 198/861 |
| 3,410,389 | 11/1968 | Ashton et al. | 198/592 |
| 3,435,941 | 4/1969 | Mayrath | 198/592 |
| 3,595,379 | 7/1971 | Campbell | 198/861 |
| 3,721,332 | 3/1973 | Brink | 198/94 |
| 3,746,143 | 7/1973 | Bartusek et al. | 198/88 |
| 3,746,144 | 7/1973 | Englert | 198/91 |
| 3,773,164 | 11/1973 | Bradley | 198/592 |
| 3,796,296 | 3/1974 | Bakker | 198/861 |
| 3,828,919 | 8/1974 | Holtsclaw et al. | 198/735 |

FOREIGN PATENT DOCUMENTS

| 2716094 | 10/1978 | Fed. Rep. of Germany | 198/735 |
|---|---|---|---|
| 1055643 | 2/1954 | France | 198/735 |
| 135065 | 4/1979 | German Democratic Rep. | 198/612 |

OTHER PUBLICATIONS

"Coal Handling:Redler", Stephen–Adamson, Inc., Industry Week 2-9-1981, p. 34.
"Kushion–Flo Paddle Elevators", Henke Machines, Inc., Sep. 1981.

Primary Examiner—Joseph E. Valenza
Assistant Examiner—Daniel R. Alexander
Attorney, Agent, or Firm—Andrus, Sceales, Starke & Sawall

[57] ABSTRACT

A conveyor construction for conveying materials, such as grain, to an elevated location. The conveyor construction comprises a base or supporting structure and an auger conveyor is mounted horizontally on the base. Grain is fed into a hopper at one end of the auger and the discharge end of the auger is provided with a pair of kicker paddles which propel the grain laterally into the lower end of a vertical endless belt conveyor. The endless belt conveyor includes a plurality of integrally molded cleats that convey the grain upwardly within a vertical passage in the conveyor housing and the grain is discharged from the upper end of the housing. The vertical conveyor is mounted for pivoting movement relative to the auger conveyor to adjust the angularity of the vertical conveyor.

4 Claims, 8 Drawing Figures

U.S. Patent   Aug. 13, 1985   Sheet 1 of 3   4,534,461
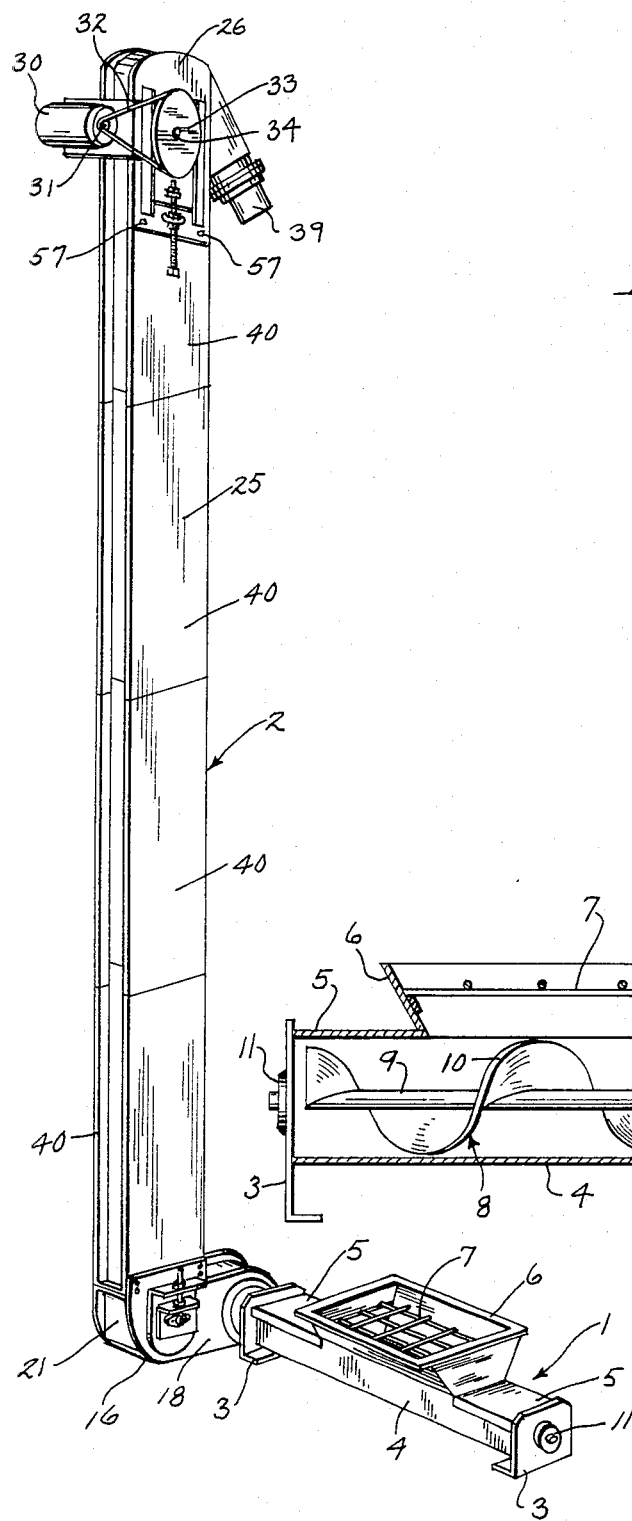
Fig.1
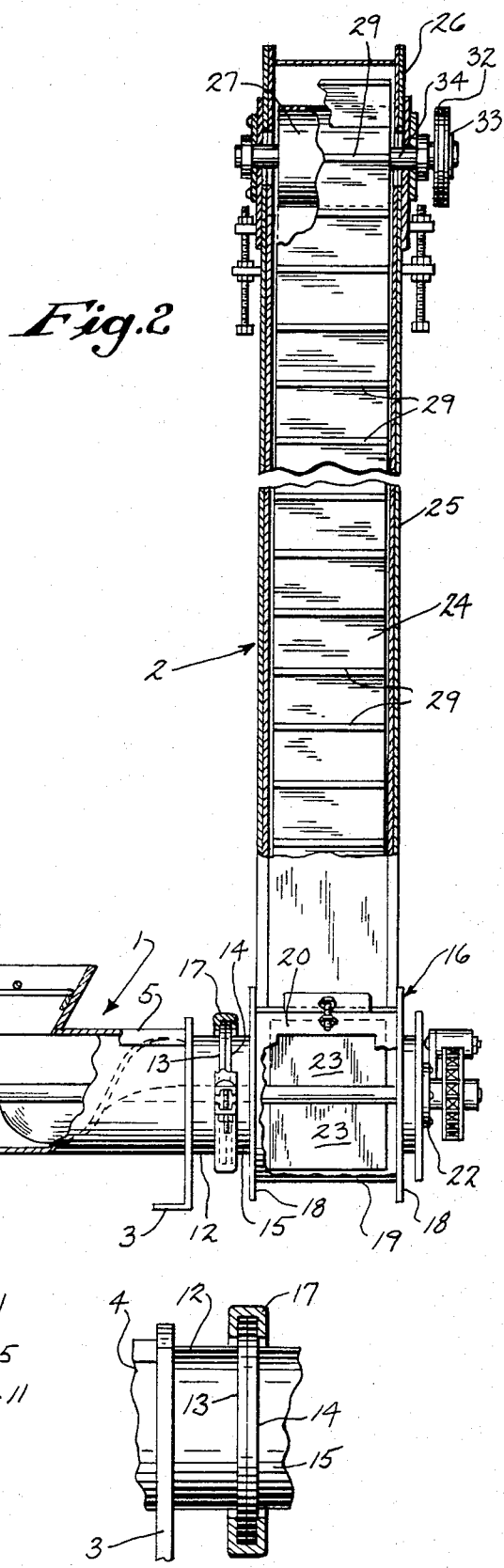
Fig.2
Fig.8

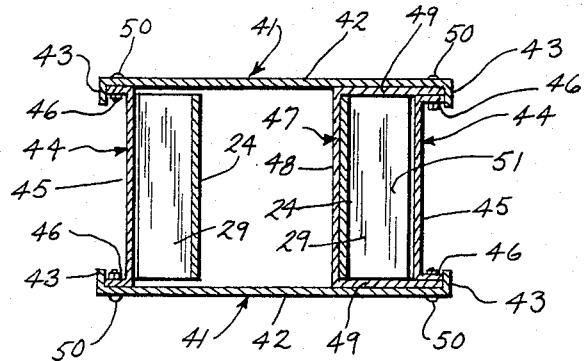
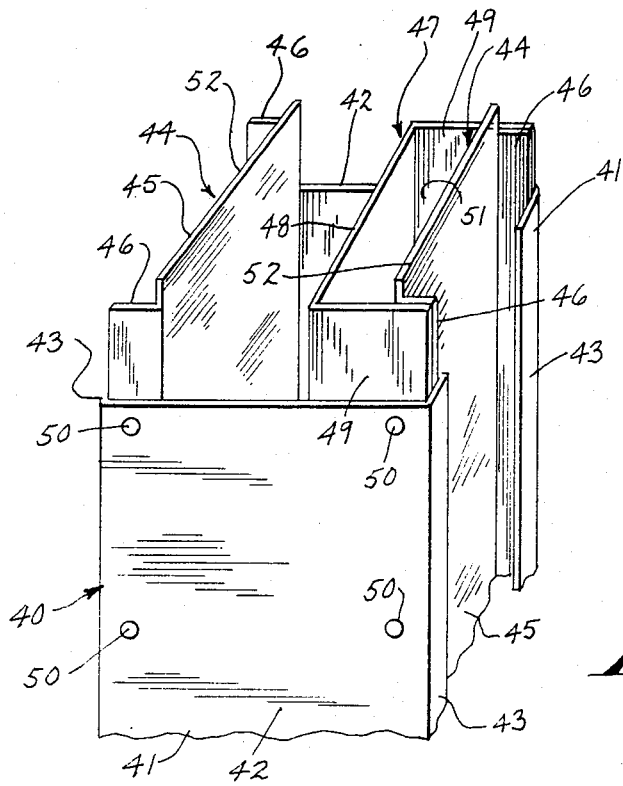
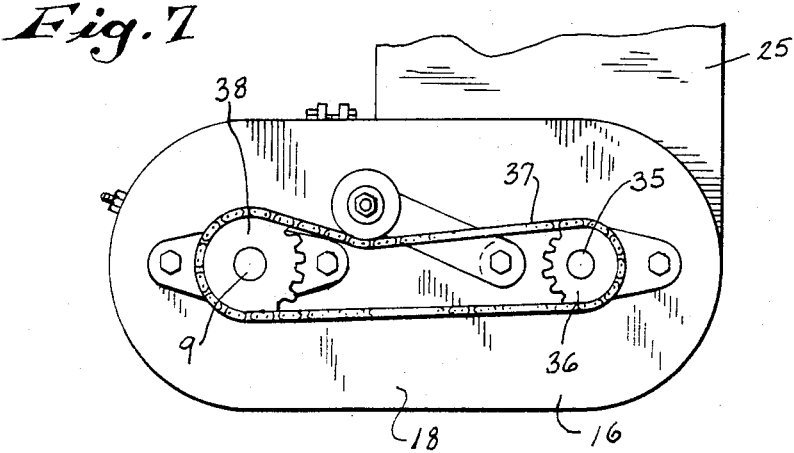

CONVEYOR CONSTRUCTION FOR CONVEYING MATERIALS TO AN ELEVATED LOCATION

BACKGROUND OF THE INVENTION

In livestock feeding systems, vertical conveyors are frequently used to convey grain or other feed material upwardly to overhead feed conveyors. In one type of conveying system, the grain is fed to a roller mill where the grain is cracked and discharged into an auger-type horizontal conveyor. The auger conveyor in turn feeds the grain to the lower end of a vertical auger conveyor which elevates the grain and delivers it to an overhead conveyor system. The use of an auger-type vertical conveyor has certain disadvantages in that an expensive bevel gear arrangement is required to connect the vertical auger with the horizontal auger. Furthermore, the auger is subject to corrosion, and being fixed in length, cannot be readily adapted to convey materials to different elevations.

In other conveying systems, a bucket conveyor is employed to elevate the grain or other feed material, but a bucket conveyor is restricted to vertical travel and cannot be varied in inclination to regulate the vertical position of discharge of the conveyor.

SUMMARY OF THE INVENTION

The invention is directed to an improved conveyor assembly for conveying materials, such as grain, to an elevated location. In accordance with the invention, an auger conveyor is mounted horizontally on a base or supporting structure and grain or other material to be conveyed is fed into a hopper at the feed end of the auger. The discharge end of the auger is provided with a pair of kicker paddles which propel the grain laterally into the lower end of a vertical conveyor. The vertical conveyor includes an endless belt having a plurality of integrally molded cleats that convey the grain upwardly within a vertical passage in the conveyor housing, and the grain is discharged from the upper end of the housing to an overhead conveyor or other distribution site.

The vertical housing is pivotally mounted with respect to the auger conveyor housing so that the vertical conveyor can be adjusted in angularity and can be varied in position from a vertical to a near horizontal attitude. Through this adjustment, the vertical height and location of discharge of the grain from the vertical conveyor can be readily changed.

The use of the endless belt with the integrally molded cleats provides a smooth and quiet operation. In addition, the belt is resistant to corrosion and provides less of a safety hazard than a vertical auger-type conveyor.

As an added aspect of the invention, the vertical conveyor has an improved housing construction. More particularly, the housing of the vertical conveyor is composed of a series of sections which are connected in end-to-end relation. Each housing section comprises a pair of spaced, generally U-shaped side members, each consisting of a central web and a pair of side flanges. Connecting the corresponding ends of the side members are a pair of generally U-shaped end members, each including a central section that extends between the side members and a pair of side flanges that are exposed flatwise with respect to the central web of the corresponding side members.

In addition, each housing section includes a trough member which is spaced from one of the end members to define a conveying passage within which the conveying run of the belt operates.

The end member and trough member of each housing section project beyond the corresponding ends of the side members so that the joints between the side members are staggered with respect to the joints between the end members and trough members. This provides an overlapping relationship between the joints which minimizes leakage of grain from the housing and eliminates the need of outer splice plates to connect the conveyor sections together.

Other objects and advantages will appear in the course of the following description.

DESCRIPTION OF THE DRAWINGS

The drawings illustrate the best mode presently contemplated of carrying out the invention.

In the drawings:

FIG. 1 is a perspective view of the conveyor construction of the invention;

FIG. 2 is a side elevation of the conveyor construction with parts broken away in section;

FIG. 5 is a section taken along line 5—5 of FIG. 3;

FIG. 6 is a fragmentary perspective view of one of the housing sections of the vertical conveyor;

FIG. 7 is an end view showing the drive connection between the vertical conveyor and the auger; and FIG. 8 is an enlarged fragmentary side elevation showing the clamping arrangement for connecting the auger conveyor and the vertical conveyor.

DESCRIPTION OF THE ILLUSTRATED EMBODIMENT

Figure 3:
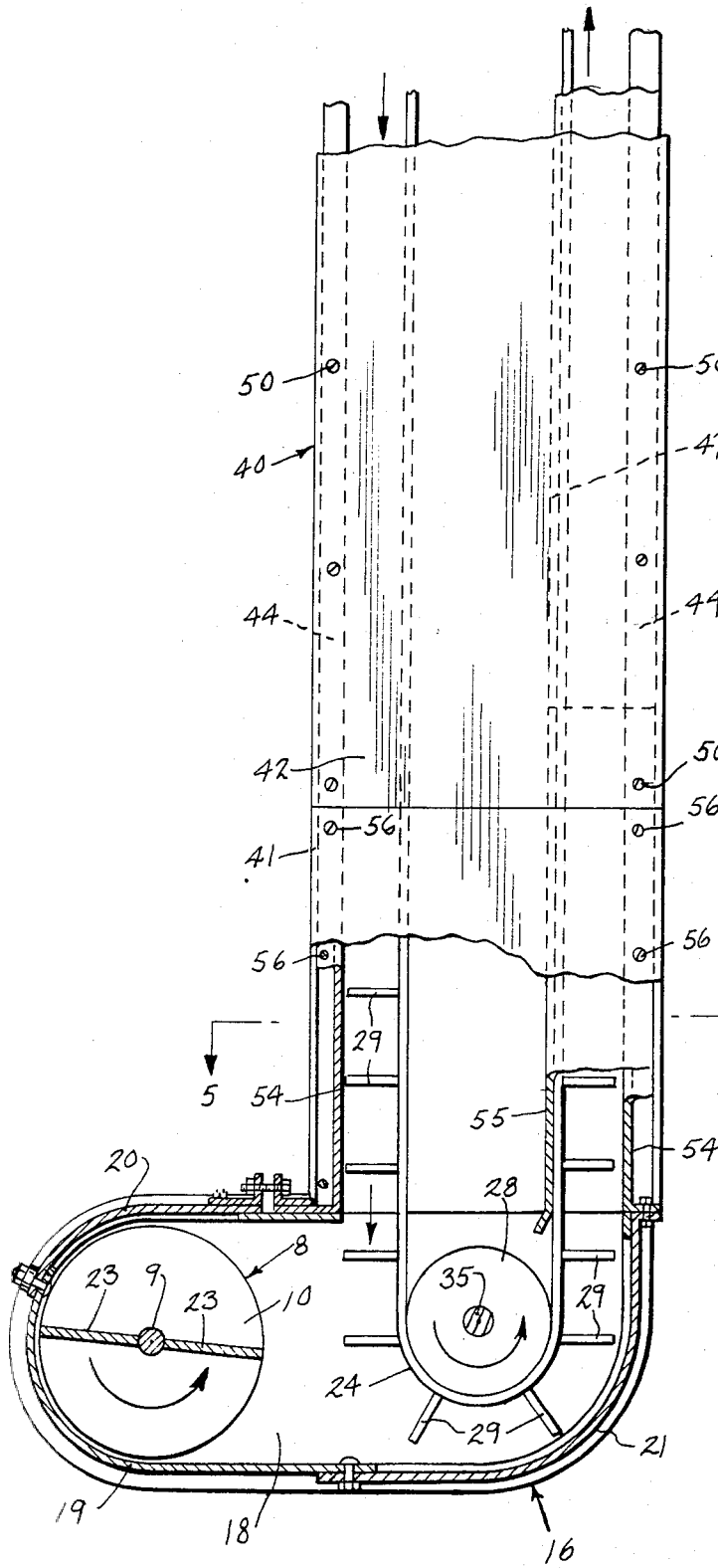
FIG. 3 is an enlarged fragmentary end view of the conveyor construction with parts broken away in section.

The drawings illustrate a conveyor assembly for conveying grain or other materials to an elevated location. In general, the conveyor assembly includes a horizontal auger-type conveyor 1 which receives the grain and delivers it to the lower end of a vertical conveyor 2 that conveys the grain to the elevated location.

The horizontal conveyor 1 includes a pair of fixed legs or supports 3, and a trough 4 having a generally U-shaped cross section is mounted between legs 3. Cover plate 5 encloses a portion of the open upper end of the trough 4 and the grain is fed into the trough through a hopper 6. The lower end of the hopper is provided with a protective grid or grille 7.

Mounted for rotation within trough 4 is an auger 8 that comprises a horizontal shaft 9 and a spiral flight 10 which is connected to shaft 9. One end of shaft 9 is journalled within a bearing assembly 11 mounted in the end wall of trough 4.

As best illustrated in FIG. 2, a collar 12 is secured to the discharge end of trough 4 and is provided with an outwardly extending flange 13. Flange 13 is disposed in flatwise contact with flange 14 of collar 15 that extends outwardly from lower housing 16 of vertical conveyor 2. A conventional ring clamp 17 is employed to secure flanges 13 and 14 together.

With this construction, the vertical conveyor 2 is cantilevered and supported solely from the horizontal conveyor 1. By loosening the clamp 17, the collar 15 of vertical conveyor 2 can be pivoted with respect to the horizontal conveyor to thereby vary the angularity of vertical conveyor 2. This construction allows substantially complete adjustment from 0° to 90° of the vertical conveyor 2 with respect to horizontal conveyor 1 and provides a convenient manner of adjusting the location and elevation of the discharge from the vertical conveyor.

As best illustrated in FIGS. 2 and 3, the lower housing 16 is composed of a pair of generally flat side plates 18 which are connected by a curved end plate 19. The side edges of end plate 19 are welded to the respective side plates 18. A pair of access openings are provided between side plates 18, one at upper end of housing 16 and the second at the lower corner of housing 16, which are enclosed by removable, flanged, cover plates 20 and 21.

As shown in FIG. 2, shaft 9 of auger 8 extends through lower housing 16 and the end of shaft 9 is journaled in bearing assembly 22 mounted on the outer side plate 18. The portion of shaft 9 located within housing 16 carries a pair of diametrically opposed kicker paddles 23 which operate to propel or throw the grain laterally where it can be engaged by an endless belt conveyor 24, that is mounted for travel within the elongated central housing member 25 of vertical conveyor 2. Vertical conveyor 2 also includes an upper housing member 26 which encloses the upper end of the central housing member 25.

As shown in FIG. 2, belt 24 is carried by an upper pulley 27 journaled within upper housing member 26 and by lower pulley 28 which is mounted for rotation in lower housing member 16. Belt 24 is formed of flexible, rubber-like material and includes a plurality of spaced, transverse cleats 29 that are integrally molded with the belt.

To drive the belt 24, a motor 30 is mounted on a bracket attached to upper housing section 26 and the drive shaft of motor 30 carries a pulley 31 that is connected by belt 32 to pulley 33. Pulley 33 is mounted on the outer end of shaft 34 which carries the upper conveyor belt pulley 27. With this arrangement, operation of the motor will rotate the upper pulley 27 to drive the belt 24 in its endless path.

Movement of belt 24 will rotate lower idler pulley 28, and the outer end of shaft 35 of idler pulley 28 carries a sprocket 36 which is connected by chain 37 to a sprocket 38 mounted on the end of auger shaft 9. Sprockets 36 and 38 are designed so that the auger will rotate at about two-thirds the speed of the lower idler pulley 28.

In operation, the grain or other materials, is fed into the hopper 6 and conveyed horizontally by auger 8. At the discharge end of the auger, the grain is propelled laterally by kicker paddles 23 into the lower housing member 16 where it is picked up by cleats 29 on the endless belt 24 and moved upwardly for discharge from the outlet 39 in upper housing member 26.

The invention also includes a novel construction for the elongated housing of vertical conveyor 2. Central housing member 25 is composed of a series of housing sections 40 which are connected in end-to-end relation to provide the vertical conveyor with the desired length. Each housing section 40 includes a pair of generally U-shaped side members 41 composed of a central web 42 and a pair of generally parallel side flanges 43. Connecting the side members together are a pair of U-shaped end members 44, each having a central section 45, which extends laterally between side members 41, and a pair of side flanges 46, which are disposed flatwise with respect to side members 41.

In addition, a generally U-shaped trough member 47 is spaced inwardly from one of the end members 44. Trough member 47 includes a central section 48, which is parallel to central section 45 of the corresponding end member 44, and a pair of side flanges 49 which are disposed between the corresponding side members 41 and side flanges 46. The members 40, 44 and 47 are joined together by bolts 50.

Trough member 47 and the adjacent end member 44 define a conveying channel 51 within which the conveying run of the belt 24 travels. As best illustrated in FIG. 5, the belt is supported against the central portion 48 of trough member 47, while the outer extremities of the cleats 29 ride in close proximity to the corresponding central section 45 of end member 44. This construction provides a series of generally closed compartments within which the grain is contained as it is moved upwardly by the belt 24.

Figure 4:
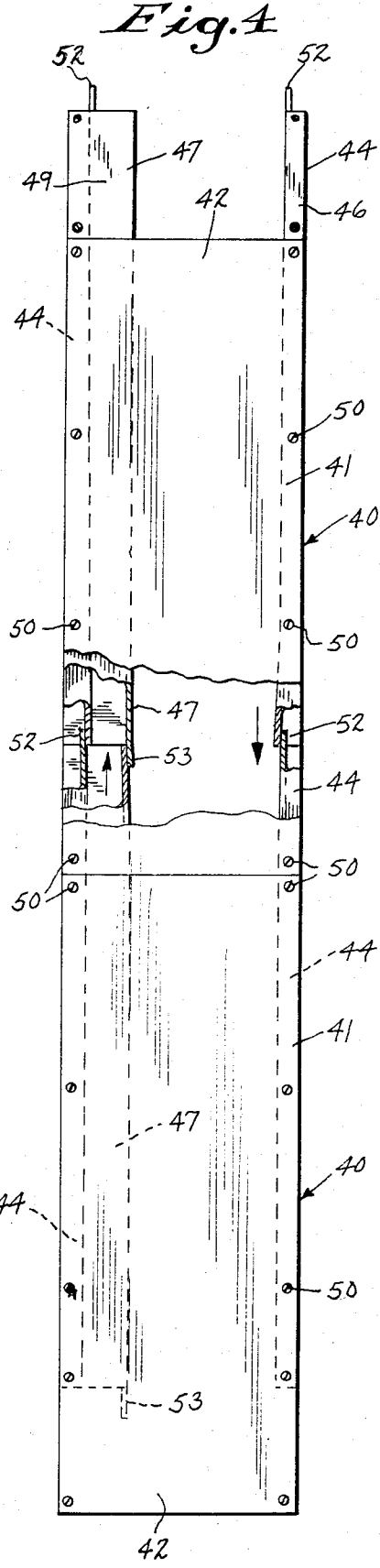
FIG. 4 is a plan view of a pair of housing sections connected in end-to-end relation with parts broken away.

As best illustrated in FIG. 6, the end members 44 and trough members 47 of each housing section 40 are offset longitudinally from the respective side members 41, so that the upper ends of end members 44 and trough member 47 project upwardly beyond the corresponding ends of side members 41. In addition, the upper end of the central web 45 of each end member 44 is provided with an upwardly extending lip 52, while the central web 48 of trough member 47 has a downwardly extending lip 53. When the housing sections 40 are assembled, the extending lips 52 and 53 are positioned in overlapping relation with the ends of the webs 45 and 48, respectively, of the next adjacent sections to provide sealed, lapped joints. In addition, the projecting lower ends of the side members 41 of each section 40 overlap the joints between the ends of adjacent end members 44 and trough members 47, as best shown in FIG. 4.

To connect the lowermost housing section 40 to the lower housing member 16, a pair of auxiliary end members 54 are secured within the open upper end of the housing 16 and similarly, an auxiliary trough member 55 is connected to housing member 16 and projects upwardly, as illustrated in FIG. 3. As the lower ends of the side members 41 of each section 40 project downwardly beyond the corresponding end members 44 and trough members 47, the lower projecting ends of the side members are connected by bolts 56 to the upwardly projecting members 54 and 55.

Similarly, the upwardly projecting ends of the end members 44 and trough members 47 of the uppermost section 40 are received within the lower end of upper housing assembly 26 and secured thereto by bolts 57.

During operation, the grain is conveyed upwardly along the inner surfaces of the end members 44 of sections 40, and with the conveyor construction provides a continuous relatively smooth surface without gaps or interruptions to interfere with the flow of grain or obstruct movement of the cleats.

In addition, the overlapping arrangement of the housing sections eliminates the need of exterior splice plates and aids in minimizing leakage of grain from the conveyor.

Various modes of carrying out the invention are contemplated as being within the scope of the following claims particularly pointing out and distinctly claiming the subject matter which is regarded as the invention.

We claim:

1. A conveyor construction, comprising a supporting structure, a horizontally oriented auger conveyor mounted on said supporting structure and having a feed end and a discharge end, said auger conveyor comprising an auger shaft and a spiral flight connected to said shaft, a second conveyor disposed at an angle to the horizontal and offset laterally from said auger conveyor, said second conveyor comprising a housing, an endless belt mounted for travel within said housing, said housing having an inlet opening disposed at one end and having a discharge outlet disposed at the opposite end, pivotal means for pivotally connecting said second conveyor to the discharge end of said auger conveyor for pivotal movement about the axis of said auger shaft, said pivotal means comprising a first annular fixed element secured to said auger conveyor and a second annular element secured to said housing and disposed to rotate relative to said first element, whereby said second conveyor can be pivoted relative to said auger conveyor from a substantially horizontal position to a vertical position, clamping means for clamping said two elements together to prevent rotation of said second conveyor relative to said auger conveyor, a plurality of cleats disposed in spaced relation on the belt, drive means for driving the belt, and a transfer member operably connected to said auger conveyor and disposed laterally of said inlet opening and disposed to propel said material laterally into said inlet opening, said housing having a longitudinally extending passage, said belt having a conveying run and a return run, said conveying run operating within said passage to elevate said material from the inlet opening to the discharge outlet, said housing of said second conveyor comprising a series of housing sections connected in end-to-end relation, each housing section comprising a pair of spaced side members and a pair of end members connecting the corresponding edges of the side members, a trough member spaced inwardly from one of said end members to define said longitudinally extending passage, the ends of the end members and trough members of each section being offset longitudinally from the corresponding ends of the side members of said section so that the joints between adjacent ends of the end members and trough members are staggered with respect to the joints between adjacent ends of the side members, each end member including a central section extending between the side members, a lip disposed on one end of each central section, said lip being planar with said central section, the lip on the end member of one housing section being disposed in lapping relation with the end of the central section of the end member of the next adjacent housing section, each trough member including a central web disposed parallel to the central sections of said end members and extending between said side members, a second lip disposed on one end of the central web of each trough member, said second lip being planar with said central web, the second lip of the trough member of one housing section being disposed in lapping relation with the central web of the trough member of the next adjacent housing section.

2. The construction of claim 1, and including a drive pulley disposed at said opposite end of the housing, an idler pulley located at said one end of the housing, said belt being trained on said pulleys, said auger shaft being disposed parallel to the axis of said idler pulley, drive means mounted on said opposite end of the housing and operably connected to said drive pulley to thereby drive said drive pulley and said belt, and connecting means operably connecting said idler pulley to said auger shaft to thereby drive said auger.

3. The construction of claim 1, wherein said one end of the housing is provided with a laterally extending extension, the discharge end of said auger conveyor disposed in said extension, said second element being secured to said extension.

4. The construction of claim 1, wherein the pivotal connecting means comprises the sole support for said second conveyor.

* * * * *